Dec. 11, 1923.

M. VAN METER

WHEEL

Filed Aug. 22, 1921

1,476,780

Witness:
Geo. L. Chapel.

Inventor:
Morton Van Meter
by Cyrus W. Rice
his Attorney.

Patented Dec. 11, 1923.

1,476,780

UNITED STATES PATENT OFFICE.

MORTON VAN METER, OF CADILLAC, MICHIGAN.

WHEEL.

Application filed August 22, 1921. Serial No. 494,364.

*To all whom it may concern:*

Be it known that I, MORTON VAN METER, a citizen of the United States, residing at Cadillac, in the county of Wexford and State of Michigan, have invented new and useful Improvements in Wheels, of which the following is a specification.

The present invention relates to wheels, particularly such as have wire or "tension" spokes; and its object is to provide a wheel which shall possess sufficient rigidity to withstand injury from thrusts exerted in its axial direction, and whose spokes shall be nevertheless protected from contact with such objects as street curbs and the like.

In prior wheels of this character, it has been necessary to incline the spokes which resist axial thrusts at such an acute angle to the wheel's axis that their inner portions adjacent the hub must extend beyond the outer edge of the rim or felloe of the wheel and are thus exposed to injury from striking street curbs and the like.

My present invention obviates this difficulty; for although my wheel is rigid enough to withstand deforming axial thrusts, its spokes are wholly between the planes in which lie the edges of the wheel's circumferential member, i. e. its rim, felloe or tire.

Figure 1:
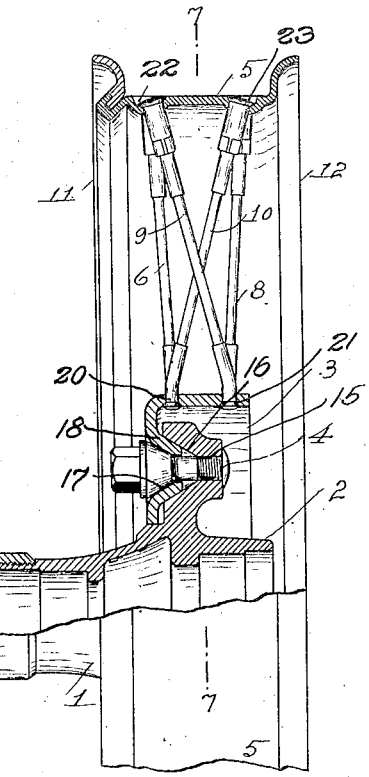
Figure 2:
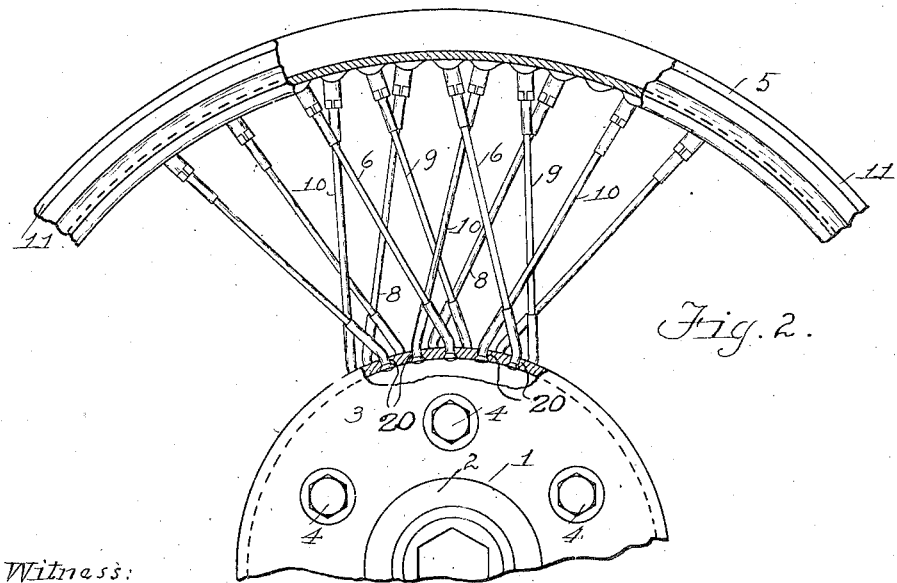

My object is attained by, and the invention finds preferable embodiment in, the structure hereinafter particularly described in the body of this specification and illustrated by the accompanying drawings, in which:

Figure 1 is a view of a portion of a wheel, the upper part thereof being sectioned on a radial plane; and Figure 2 is a view of a portion of the outer side of said wheel, a part of the central member and a part of the circumferential member thereof being shown in section.

In the views, the wheel has a central member designated generally 1 which in the particular construction illustrated comprises the usual hub portion 2 and a surrounding spoke-carrying portion 3 detachably connected to the hub portion as by the threaded bolts 4, and also has the circumferential member 5, in the construction illustrated being the "rim" of any usual form adapted to carry a pneumatic tire. These members 1 and 5 are connected by wire or "tension" spokes, which in the illustrated construction are comprised in four sets, viz: a set of spokes 6 extending between said members and lying at one side of the plane indicated by the dotted line 7—7 in Figure 1, said plane being preferably the central plane of the circumferential member perpendicular to the wheel's axis; another set of spokes 8 extending between said members and lying at the opposite side of said plane, these two sets being the spokes which principally support the central member 1; another set of spokes 9 extending between said members in a direction considerably inclined to the wheel's axis; and another set of spokes 10 extending between said members in a direction similarly inclined, but oppositely from the last mentioned sets, to the wheel's axis, the last two sets of spokes being those which principally resist axial thrusts.

All the spokes are wholly between the planes in which lie the opposite edges 11 and 12 respectively of the circumferential member 5 and are thus protected from contact with objects outside such planes.

The set of spokes 9 and the set of spokes 10 intersect the common plane 7 which, as stated, is preferably the central plane of the circumferential member.

By increasing the diameter of the central member 1 relatively to the diameter of the circumferential member 5, the length of the spokes is shortened, and they may therefore be inclined at a more acute angle to the wheel's axis (thus adding to their axial thrust-resisting effect) and will still be within the planes of the circumferential member's edges 11 and 12. The diameter of the central member 1 may be thus increased by providing in addition to the usual hub portion 2 of any wheel, the detachable surrounding portion 3 on which the inner ends of the spokes are carried. By so doing, a double purpose is served; a wheel is provided having a circumferential tire carrying member which may be detached from the usual hub portion of the wheel; and a wheel having sufficient rigidity to resist deforming axial thrusts and whose spokes are nevertheless protected from injury is also provided.

The bolts 4 extend through registering openings 15 in the tapering sockets 16 in the hub portion 2 and through registering openings 17 in the tapering lateral extensions 18 in the spoke-carrying portion 3 of the wheel, these angularly spaced extensions fitting in the similarly spaced sockets, whereby a rigid connection of the hub portion and spoke-carrying portion is effected.

It will be seen that the series of spokes 6 and 9 extend from their angularly spaced points of attachment adjacent the left hand edge of the circumferential member (as seen in Fig. 1), in directions diagonal to the wheel's radial lines (as seen in Figure 2), to angularly spaced points of attachment adjacent alternately opposite edges of the central member; and that a second series of spokes 8 and 10 extend from their angularly spaced points of attachment adjacent the opposite edge (the edge at the right hand side of Figure 1) of the circumferential member, in directions diagonal to the wheel's radial lines, to angularly spaced points of attachment adjacent alternately opposite edges of the central member; and that the spokes of one of said series extend thus diagonally oppositely to those of the other series, as seen in Figure 2.

By this arrangement all the spokes may be of approximately the same length; and only one row of holes 20 or 21 need be provided adjacent either of the opposite edges of the spoke-carrying elements 3, and only one row of holes 22 or 23 need be provided adjacent either of the opposite edges of the circumferential member—all which may be done without necessitating the bending of the spokes where they cross each other; and the angular disposition of all the holes 22 is approximately the same to accommodate the diagonal direction the spokes assume, and that the same is true as to the holes 23. This obviates any resetting of the machine by which either row of holes 22 or 23 is punched.

The invention being intended to be pointed out in the claim, is not to be limited to or by details of construction of the particular embodiment thereof illustrated by the drawings or hereinbefore described.

I claim:

In a wheel; a central member; a circumferential member; a series of spokes extending from angularly spaced points of attachment adjacent one edge of the circumferential member, in directions diagonal to the wheel's radial lines, to angularly spaced points of attachment adjacent alternately opposite edges of the central member; and a second series of spokes extending, from angularly spaced points of attachment adjacent the opposite edge of the circumferential member, in directions diagonal to the wheel's radial lines, to angularly spaced points of attachment adjacent alternately opposite edges of the central member; the spokes of one series extending thus diagonally oppositely to those of the other series.

In testimony whereof I have hereunto set my hand at Grand Rapids, Michigan, this 20th day of August, 1921.

MORTON VAN METER.